Aug. 30, 1932.  J. R. REYBURN  1,875,262
CONNECTER FOR CHAINS
Filed Dec. 7, 1931
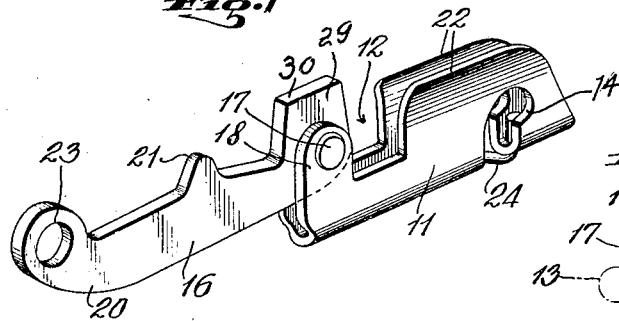
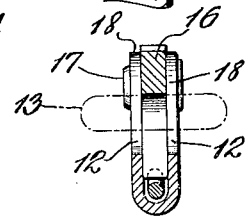
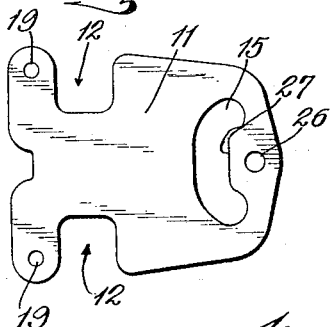
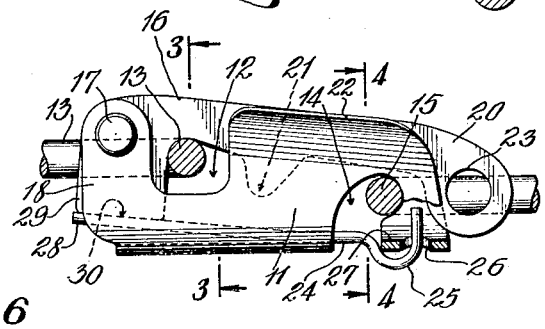
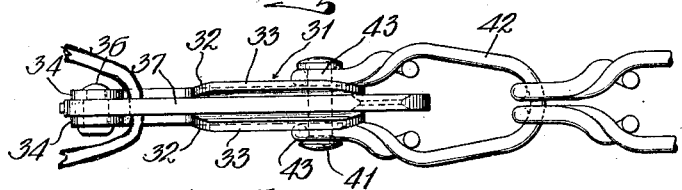
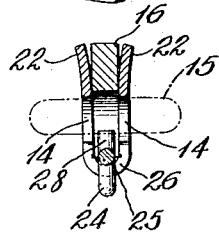
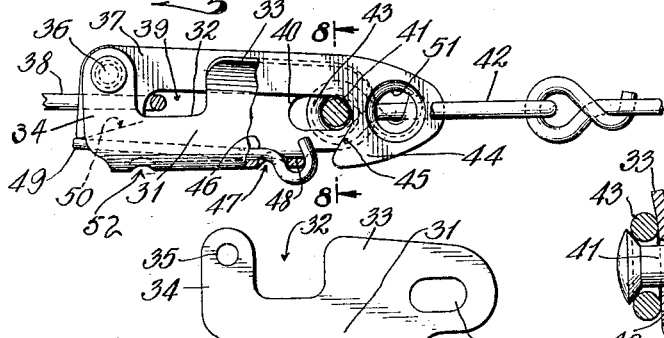
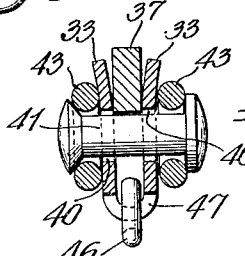
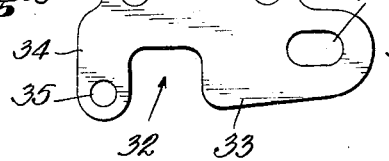
INVENTOR.
John R. Reyburn,
BY
ATTORNEY Patented Aug. 30, 1932

1,875,262

UNITED STATES PATENT OFFICE

JOHN R. REYBURN, OF FAIRFIELD, CONNECTICUT, ASSIGNOR TO AMERICAN CHAIN COMPANY, INC., A CORPORATION OF NEW YORK

CONNECTER FOR CHAINS

Application filed December 7, 1931. Serial No. 579,360.

This invention relates to chain-connecters and is of particular utility when embodied in connecters for the side chains of anti-skid tire chains, although the connecter is capable of more general use.

An object of the invention is to provide a connecter of sturdy and inexpensive construction which has but few parts and is not liable to impairment by rough usage.

Another object is to provide a connecter which can be readily manipulated and which will maintain its connection firmly both when the chain parts connected by it are under tension, and also when the chain is slack.

The above and other features of the invention are illustrated and described fully in the accompanying drawing and specification and are pointed out in the claims.

In the drawing—

Fig. 1 is a view in perspective of a connecter in which certain of the features of the invention are embodied.

Fig. 2 shows the connecter of Fig. 1 with its parts in folded position, assembled with the terminal links of a chain.

Fig. 3 is a view in vertical section on the line 3—3 of Fig. 2.

Fig. 4 is a similar view on the line 4—4 of Fig. 2.

Fig. 5 is a plan view of a sheet metal blank used in forming the casing member of the connecter shown in the preceding figures.

Fig. 6 is a plan view of a modified form of connecter embodying the invention, shown as assembled with the terminal links of a chain.

Fig. 7 is a view in side elevation of the connecter shown in Fig. 6 with parts broken away to reveal interior structure.

Fig. 8 is a view in vertical section on the line 8—8 of Fig. 7.

Fig. 9 is a plan view of the sheet metal blank used in forming the casing member of the connecter shown in Figs. 6–8, inclusive.

In the now-preferred embodiment of the invention selected for illustration and shown in Figs 1–5, inclusive, the part designated generally by the reference character 11 is the casing member of a connecter designed particularly for use in connecting together the terminal links of such a chain as one of the side-chains of an anti-skid tire chain for vehicle wheels.

In pursuance of the invention, this casing member may be conveniently formed from such a blank of sheet metal as that illustrated in Fig. 5, which, in accordance with the invention, is bent up to form a casing of U-shape in cross section, as shown in Figs. 2, 3, and 4.

The side walls of the casing are formed with open notches 12, which are in alignment transversely of the casing and are adapted to receive a terminal link of a chain as indicated by the reference character 13 in Fig. 2.

In further pursuance of the invention the casing is also formed with a notch or slot extending into the walls from the bottom thereof and preferably having the arcuate form shown at 14 in Fig. 2.

This slot is adapted to receive another terminal link of a chain as indicated at 15 in Fig. 2.

In accordance with another feature of the invention the connecter is provided with a lever blade 16 which is preferably connected with the casing by a pivot 17 extending through the portions 18 at the extremity of the casing nearest the notches 12.

The blank shown in Fig. 5 is provided with suitable holes 19 to receive the rivet 17.

The lever 16 is of suitable length to extend at 20 beyond the slotted forward end of the casing and preferably has a projection 21 intermediate its ends and serving to guide the lever when the latter is swinging downward into and between the walls 22 of the casing, which are preferably somewhat flared along their free margins to aid the entrance of the projection 21 and of the lever into the casing when swung over into the position shown in Fig. 2.

The free forward end of the lever may advantageously be provided with an opening 23 to facilitate engagement thereof by the fingers of the operator or by insertion of a tool when it is desired to swing the lever backward out of folded position into the position shown in Fig. 1.

When the lever is in the position shown in Fig. 1, the terminal link 13 of a chain may be readily applied thereto, and will preferably be passed along beyond the projection 21, so that upon swinging the lever over into the folded position shown in Fig. 2, the link will be properly aligned and carried down into the notches 12, where it will be held as long as the lever occupies the folded position.

As a suitable form of device to aid in maintaining the lever in said folded position, I have shown at 24 a spring having at one end a hook 25 adapted to enter a hole 26 provided for that purpose in the bottom wall of the casing, the hook embracing the bottom wall 27 adjacent thereto.

The spring is of such shape that when thus held in place its free end 28 is extended upwardly away from the bottom wall into position for engagement with a heel or cam 29 with which the lever is provided below the pivot 17, and when the lever is in its closed position the upwardly extending spring portion 28 acts upon the lower surface 30 of the heel to prevent accidental backward swinging movement of the lever, so that by this construction the lever is maintained in its closed position regardless of any tension which may be exerted upon the link members 13 and 15. The arcuate form of the slot 14 is designed to aid in maintaining the link 15 in its proper relative position. Escape of the link 15 is prevented by the portion 24 of the spring extending across the mouth of the slot 14.

The heel portion 29 of the lever preferably extends slightly beyond the adjacent portions of the projections 18.

In a now-preferred embodiment of the invention which is illustrated in Figs. 6–9, inclusive, the reference character 31 designates a casing member which is desirably formed by bending up a blank of sheet metal of approximately the original shape shown in Fig. 9, to constitute a casing having the U-shape in cross section shown in Figs. 6, 7, and 8.

The casing is provided on its open side with a notch 32 formed by aligned notches made in each of the side walls 33 near one end thereof, leaving extremities 34 which are pierced at 35 to receive a rivet 36 which serves as a pivot for a lever blade 37. The latter is adapted to receive a terminal link 38 of a chain, such as one side chain of a tire chain, and acts, when swung over, to draw the link down into a recess 39 (see Fig. 7) left between the lever and the bottoms of the notches 32, thus retaining the link in the notches until the lever is swung back to permit removal of the link.

The lever 37 is of suitable length to extend a short distance beyond the other end of the casing, in the walls of which are formed aligned body slots 40, elongated as shown to permit a limited sliding movement therein of a bolt or rivet 41 which serves for the attachment to the casing of another link 42 which may be the terminal link at the other end of the side chain that embodies the link 38, the rest of the chain not being shown, as it may be a conventional side chain, or any form of chain suitable to be connected by the connecter disclosed.

In the instance illustrated, the links are of conventional form, and the link 42 has aligned eyes 43 embracing the casing and permanently connected therewith by the rivet 41, although such a permanent attachment is not essential.

The free end of the lever 37, in pursuance of a preferred feature of the invention, is provided with a hook 44, the nose of which is tapered and extends, when the lever is in the folded position shown in Fig. 7, downwardly and rearwardly beneath the slots 40, so that the jaw thus formed has a recessed portion 45 adapted to receive the rivet 41, co-operating therewith to hold the lever 37 in folded position when tension is exerted on the side chain, as for example when in use upon a tire.

In the preferred form shown, the connecter is provided with a spring 46, having one end passed through a bottom opening 47 formed in the casing member, the spring being bent around the adjacent wall 48 of the opening, and the spring being to such form that its free portion 49 is urged yieldingly upward against a heel or cam 50, with which the lever blade 37 is preferably provided at a region below the pivot 36, the heel preferably extending slightly beyond the end of the casing, as shown in Fig. 7, to increase the tilting action of the spring upon the lever.

By this construction, the spring tends to urge the lever 37 toward its innermost position, when folded, regardless of any tension which may be exerted on the side chain links 38 and 42, so that when the chain is slack, the folded position of the connecter is maintained, preventing accidental displacement of the link 38.

For the purpose of facilitating the manipulation of the lever blade, the latter is preferably provided at its free end with an aperture 51, to permit engagement by the fingers of the operator or the insertion of a tool, when it is desired to unfold the lever and release the chain link 38, for removal of the tire-chain from the tire. When so unfolded by swinging back the lever, the point of the heel swings under the pivot point, being still engaged by the spring, which then tends to throw the lever open, in position for ready application thereto of the link 38 when the tire-chain is to be installed upon a tire.

If desired, one or more small apertures may be provided in the bottom of the casing, such as that shown at 52, serving to vent any particles of dirt or other extraneous substance, which might otherwise accumulate between the spring and casing, interfering with proper action of the spring.

From the above description it will be evident that each form of the connecter above described comprises only three essential operating parts, viz, the casing member, the lever blade, and the spring, all of which parts are easy to make and assemble and when so assembled constitute a sturdy connecter device which can be readily manipulated and is not subject to deterioration.

Various modifications of the connecter may be adapted without departing from the spirit of the invention herein disclosed.

I claim:

1. A connecter of the class described, comprising a member formed of sheet metal bent to form a casing of U-shaped cross section with aligned notches formed in the free edges of its walls near one end, to receive a chain link or the like, and aligned slots formed in said walls near the other end, to receive another chain link, the bottom of said casing having an aperture to receive a spring; a lever blade pivotally mounted between said walls at the end adjacent to said notches, said blade being adapted to close said notches when folded, into said casing, leaving a recess open at the bottom of said notches to receive said first mentioned chain link removably, said lever blade also having a heel portion extending downwardly below its pivot; and a spring extending near one end through said bottom aperture of said casing member and supported firmly by the wall of said aperture, said spring having a portion pressing yieldingly inward against said heel and tending normally to hold said blade closed when folded.

2. A connecter as in claim 1, said spring being adapted to aid said lever in opening when unfolded.

3. A connecter as in claim 1, having said blade extended at its free end beyond the slotted end of said casing, and provided with an aperture, in its free end, to facilitate engagement of said end manually or by a tool for the purpose of opening said blade.

4. A connecter, as in claim 1, and further characterized by having said spring arranged to close said slots, to retain in place the link lying in said slots.

5. A connecter, as in claim 1, and further characterized by having an opening in its bottom wall, below said spring, to vent particles of dirt or other extraneous substances.

6. A connecter of the class described, comprising a member formed of sheet metal bent to form a casing of U-shaped cross section with aligned notches formed in the free edges of its walls near one end, to receive a chain link or the like, and closed aligned body slots formed in said walls near the other end, to receive part of another link, the bottom of said casing having an aperture to receive a spring; and a lever blade pivotally mounted between said walls at the end adjacent to said notches, and of sufficient length to extend beyond said slots at the other end of the casing when folded into said casing, the inner side of said lever blade being shaped to form a hook at its free end with a hook point extending rearwardly from a region adjacent to the forward ends of said slots when the lever blade occupies its folded position, to a region below the lower margins of said slots, said lever blade having a heel portion bevelled downwardly and outwardly at a region below its pivot, and said blade being adapted to close said notches when folded, leaving the bottom of said notches open to receive said first mentioned chain link removably, and said body slots being of suitable length to receive, transversely of said casing, part of said second mentioned chain link, to permit rearward sliding movement of said link part to allow folding of said lever blade, and to permit forward sliding movement of said link part into the jaw of said hook, to hold said blade in closed position when said chain links are under tension in opposite directions, and a spring extending near one end through said bottom aperture of said casing member and secured to the wall of said aperture firmly, said spring having a portion pressing yieldingly inward against said heel and tending normally to hold said blade closed when folded.

In testimony whereof, I have signed this specification.

JOHN R. REYBURN.